United States Patent [19]

Jonell et al.

[11] 3,935,745

[45] Feb. 3, 1976

[54] PORE WATER PRESSURE MEASURING DEVICE

[76] Inventors: Per Olof Jonell, Engelbrektsgatan 24, S-441 37 Goteborg; Kjell Ingvar Elmgren, Kometgatan 2 F, S-441 00 Alingsas, both of Sweden

[22] Filed: Aug. 19, 1974

[21] Appl. No.: 498,379

[30] Foreign Application Priority Data
Sept. 4, 1973 Sweden............................. 7312007

[52] U.S. Cl................................................ 73/398 R
[51] Int. Cl.²........................................... G01L 9/00
[58] Field of Search.......... 73/290, 300, 301, 398 R, 73/517 AV, 4 R, 388

[56] References Cited
UNITED STATES PATENTS

| | | | |
|---|---|---|---|
| 2,447,817 | 8/1948 | Rieber | 73/301 X |
| 2,883,995 | 4/1959 | Bialous et al. | 73/4 R |
| 3,478,594 | 11/1969 | Love | 73/398 R |

FOREIGN PATENTS OR APPLICATIONS 1,908,891  9/1969  Germany............................. 73/398 R

*Primary Examiner*—Harry N. Haroian
*Attorney, Agent, or Firm*—Harness, Dickey & Pierce

[57] ABSTRACT

A pore water pressure metering device incorporating a pressure meter and a force meter influenced by said pressure meter. The device also includes a power member arranged to control the pressure exerted by said pressure meter on said force meter by applying an overriding force on said pressure meter to stop the influence of the latter on said force meter and removing said overriding force on said pressure meter whereby the influence of the latter on the force meter is resumed.

6 Claims, 6 Drawing Figures

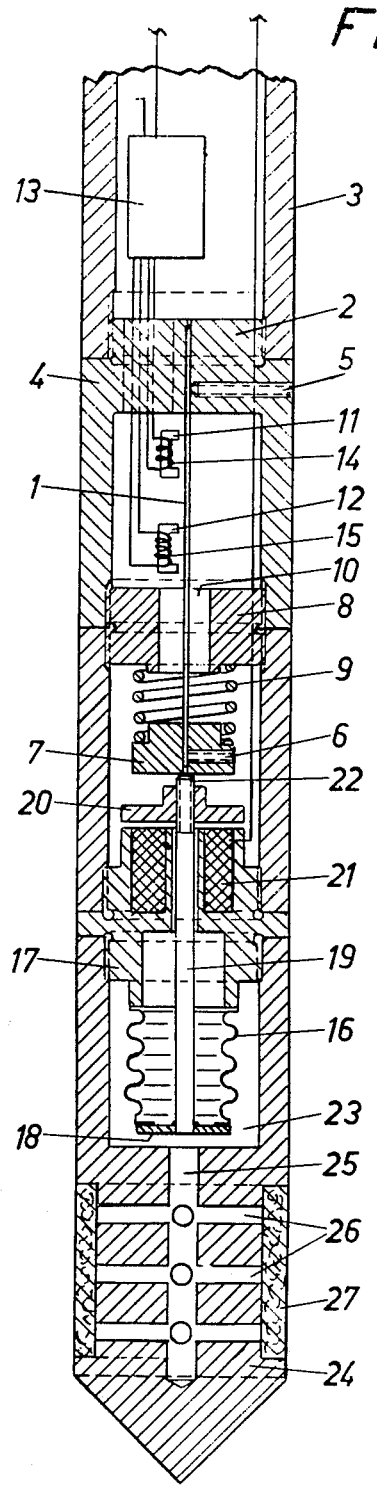
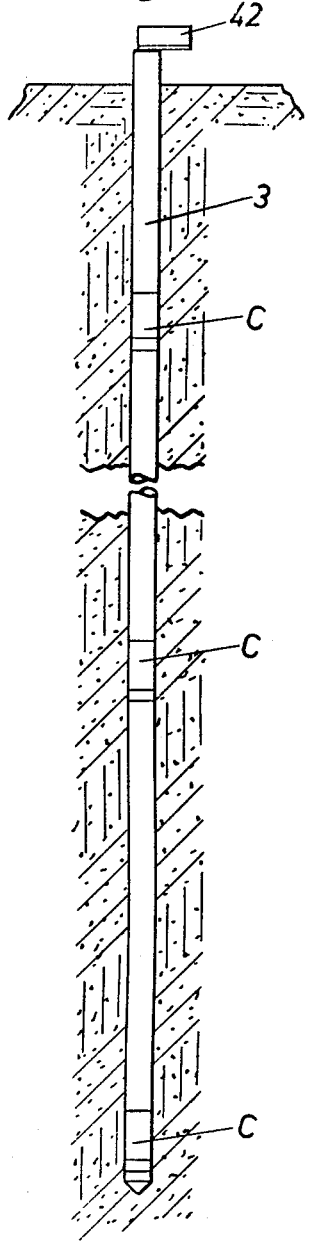
Fig.1
Fig.2

PORE WATER PRESSURE MEASURING DEVICE

BACKGROUND OF THE INVENTION

The present invention concerns an improved pore water pressure meter of the kind used to measure the water pressure inside masses of earth or clay.

Pore water pressure meters of various kinds already exist to measure the water pressures existing between the granules in earth or clay. This water pressure, the pore water pressure, is of particular importance to the capacity of clay layers to support loads, e.g. of buildings.

One kind of pore water measuring devices presently in use is provided with a diaphragm one side of which is affected by the pore water pressure. At the opposite side of the diaphragm is attached a steel wire string. The latter is under a certain tension and extends axially through a tubular body which forms part of a rod by means of which the pore water pressure meter is pressed into the ground. The opposite end of the steel string is secured to a nipple in the rod. When the diaphragm is pressed inwards by the water pressure, the tension in the string is reduced. Consequently, the string becomes less tightened and as a result hereof its natural frequency, i.e. the frequency with which the string oscillates when set in motion, is reduced. The string is kept oscillating by means of two electro-magnets provided with coils connected to a tone frequency oscillator the frequency of which thus is determined by the natural frequency of the string. The oscillator is usually incorporated in the pore water pressure meter. The meter is lowered together with the rod to the location in the mass of earth where one intends to measure the pore water pressure. To prevent earth and stones from reaching the diapgragm the latter is protected by a filter allowing passage-through of water only.

The pore water pressure meter is calibrated by allowing a known pressure to act on the diphragm whereafter the string frequency is read. The relationship between frequency and pressure thus is obtained in the form of a curve. When the pressures on both sides of the diaphragm are equal, the string oscillates at a certain frequency, denominated zero pressure frequency. When the pressure acting on the diaphragm increases, the frequency is reduced. The larger the discrepancy between the established frequency and the zero pressure frequency, the larger evidently the pressure acting on the diaphragm.

In case of excess loading of the diaphragm - as a result of vibrations and thrusts or through plastic deformation - the zero pressure frequency may, however, change. If this happens after insertion of the pore water pressure meter into e.g. an earth dyke, conventional pore water pressure meters offer no possibility of calibration thereof or of establishing the new zero pressure frequency. The results obtained in the measuring operation on the whole therefore become useless. In most instances it is impossible to know whether or not the zero pressure frequency is altered but when there are reasons to suspect that this is the case, the measuring results obtained from the pressure metered cannot be considered reliable.

SUMMARY OF THE INVENTION

The present invention has for its purpose to remedy this drawback and more specifically concerns a pore water pressure meter of the kind incorporating a pressure meter the force or motion of which is dependent on the pore water pressure to be measured, and a force meter (e.g. an extensiometer) arranged to be actuated by the pressure meter. It is characteristic of the invention that the meter incorporates a power member which - for the purpose of making possible to measure the value of the force meter when the pressure meter does not influence the force meter - is arranged to apply a force on the pressure meter of such magnitude as to override the force exerted by said meter so as to prevent the pressure meter from affecting the force meter, and to thereafter remove said force from the pressure meter and allow the latter to again transmit its force to the force meter. With the aid of a pore water meter of this kind it is possible, whenever desired, to read the measuring value of the pressure meter as soon as the force of the pore water pressure meter has been removed, and, after re-application of the force of the pressure meter, to read the measure value of the force meter caused by the prevailing water pressure. There is no need to pull the rod together with the pore water pressure meter out of the mass of earth in order to recalibrate it, not even when the measuring value of the force meter at zero water pressure (zero frequency according to the force meter embodiment outlined in the aforegoing) for one reason or another has changed. The reason therefor is that before forcing the pressing meter down into the mass of earth it is possible to establish various frequency curves in the neighbourhood of the zero pressure frequency curve and then, after said change of the zero pressure frequency, use any one of these extra curves as a reference curve in the subsequent measuring operations.

BRIEF DESCRIPTION OF THE DRAWINGS

The invention will be described more in detail in the following with reference to the accompanying, partly diagrammatical drawings, wherein FIG. 1 is a longitudinal sectional view through a pore water pressure meter in accordance with the invention, the meter being attached to the lower end of a probe rod, FIG. 2 illustrates on a reduced scale a side view of a probe rod pressed into the ground and showing pressure meters secured thereto at various points along the rod.

DETAILED DESCRIPTION OF A PREFERRED EMBODIMENT

Figure 3:
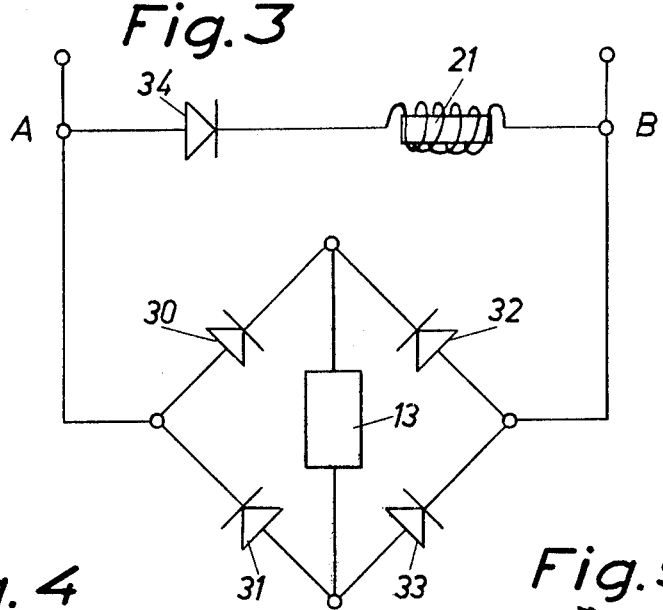
FIG. 3 illustrates a wiring diagram.

Like prior-art pore water pressure meters the meter illustrated in FIG. 1 is provided with a steel string 1, the upper end of which is attached by means of a screw 5 to an upper bottom piece 2 of a tubular portion 4 incorporated in the probe rod 3. The lower end of the string is secured by means of a similar clamping screw 6 to a sleeve 7, a helical spring 9 being held between this sleeve and a tube nipple 8 of the probe rod 3 whereby the string 1 which passes through an axial bore 10 in the tube nipple 8 is held in a tightened condition. The string 1 may be set in oscillating motion by two permanent magnets 11, 12 attached to the tube portion 4 and each one of said magnets are enclosed by a coil 15 and 14, respectively, which are connected to an oscillator 13 driven by an electric battery.

The arrangement is such that when the string is set in oscillating motion it oscillates at a certain frequency which is determined mainly by the degree of tension of the string. When the string tension is reduced, the frequency of the oscillations is reduced accordingly. The string is built into the tubular portion 4 in such a manner that a pressure force applied axially against the lower end of the string or the sleeve 7 tends to reduce the string frequency. The pressure force is obtained from the pressure meter directly affected by the pore water pressure. The meter will be described more in detail in the following.

The pressure meter consists of a bellows 16 the upper, open end of which is attached to a nipple 17 on the probe rod 3 and from the lower, closed end 18 of which a pressure rod 19 extends axially upwards through the bellows and the nipple. At the upper threaded end of said pressure rod is secured a soft iron armature 20 of an electro-magnet provided at the upper end of the nipple 17, said armature being in the form of a nut. The upper end 22 of the pressure rod 19 abuts against the lower end of the sleeve 7. The bellows 16 extend down into a chamber 23 formed in a tube portion 24 which is screwed into the nipple 17 and has one axial channel 25 and a number of radial channels 26 debouching into the axial channel holding pore water flowing into the chamber 23. The outer ends of the channel 26 are covered by a cylindrical filter preventing sand and other solid particles from entering into the chamber 23 together with the pore water.

Any water pressure increase registered during measuring with the aid of the pore water pressure meter inserted into the mass of earth, results in a slight compression of the bellows by the water forced into the chamber, and the pressure is transmitted via the rod 19 to the sleeve 7 which is forced somewhat upwards, e.g. over a distance of some hundredths of a millimeter. This diminishes the tensile force (tension) of the string 1 and the frequency thereof is reduced. The larger the increase of the water pressure, the larger the reduction of the natural frequency of the string.

As already described this frequency may be measured and a referential curve plotted therefor. To reduce the influence of any play that may exist between the upper end 22 of the rod and the sleeve 7 it may be advisable to form the bellows 16 in a manner permitting them to be comparatively heavily compressed as a result of a small pressure increase. The resiliency of the bellows 16 in this manner becomes small – the bellows may be regarded as an anti-friction (friction-less) piston - and the force of the water pressure will practically entirely be taken by the spring 9 which is far more resistant against compression than are the bellows 16.

Figure 6:
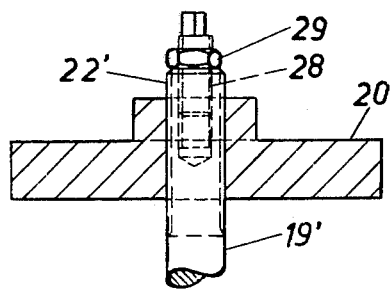
FIG. 6 illustrates, likewise on an enlarged scale, a longitudinal sectional view through the upper end of the means directly influenced by the water pressure, i.e. the pressure meter.

To eliminate the play referred to above it is possible, as illustrated in FIG. 6, to provide the upper end of the pressure rod 19' with a setting screw 28 which is threaded into the rod end 22' and provided with a locking nut 29.

In order to be able to check the pore water pressure meter it is desirable, as mentioned in the aforegoing, to measure the natural frequency of the string when the water pressure is zero or when the force of the water pressure no longer acts on the string 1. In accordance with the present invention this may be accomplished with the aid of the electro-magnet 21. When current is applied to the electro-magnet 21, the latter attracts the armature 20. As a result, the rod 19 is pulled away from the string mounting, i.e. the sleeve 7. The force exerted by the bellows 16 against the spring 9 thus becomes zero and the string 1 oscillates at the same frequency as when the pressure on the bellows 16 is zero. By an appropriate choice of material for the iron core and armature 20 of the electro-magnet the force between the armature and the iron core may be kept very small when the current through the solenoid of the electro-magnet 21 is zero. Another way of reducing this force is to de-energize the magnet core with the aid of AC.

Preferably, the oscillator 13 and the electro-magnet 21 are coupled in bridge connection as illustrated in FIG. 3. In this Figure, numeral references 30, 31, 32, 33, and 34 designate semi-conductors in which the direction of the current is the one indicated (the direction of the arrow). When a 24V battery is connected with A forming a positive pole and B a negative pole, the current will flow through both the electro-magnet 21 and the oscillator 13. Under these circumstances the zero pressure frequency of the pressure meter may be measured. On the other hand, if A is instead connected to the negative pole, current will flow only through the oscillator 13 as the frequency of the latter thus becomes dependent on the prevailing pore water pressure.

This connection is of importance if only one single wire line is used down to the pore water pressure meter and the rod 3 is used as the second line. The single wire line may be positioned externally of the rod 3. This avoids the need of passing the line through tubes when the meter is driven through the earth strata.

Figure 4:
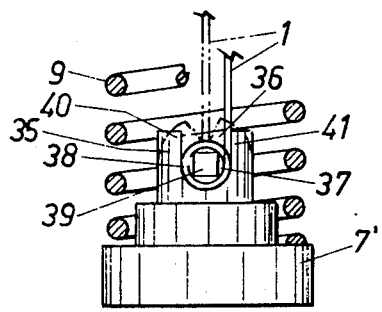
FIG. 4 illustrates on an enlarged scale and in a transverse sectional view a sleeve and the lower end of the steel string of the force meter of the instrument, illustrated by way of example.
Figure 5:
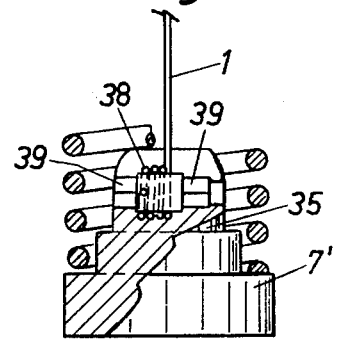
FIG. 5 is a transverse sectional view similar to FIG. 4 but as seen in a position at right angles to the view of FIG. 4.

In order to give the pore water pressure meter a calibration which does not change significantly with time it is important that the string 1 does not slide inside its mounting. One has found in practice that the screws 5 and 6 sometimes fail to retain the string ends sufficiently securely to the bottom piece 2 and the sleeve 7. FIGS. 4 and 5 illustrate a considerably more secure mounting arrangement for the ends of the string 1. In the upper portion 35 of the sleeve 7' a transverse groove 36 is formed. Said groove receives therein a round bar 37 around which the end of the string 1 is wound forming several turns 38. The bar 37 has non-round ends 39 of e.g. square cross-sectional configuration. With a diameter of 0.2 millimetres for the string 1, the bar 37 should have a diameter of appr. 0.8 millimetres. The string 1 should first be wound onto a thinner bar than bar 37 allowing the string, when the wounds 38 thereof have been pushed onto the bar 37, to be securely clamped on the latter. The walls 40, 41 are, as indicated in dash-and-dot lines in FIG. 5, pressed about the bar 37 and the turns 38 in a manner causing the material in the upper portion 35 to be plastically deformed. This both prevents the bar 37 turning inside the groove 36 and also the turns 38 of the string from sliding on the bar. Once clamped as indicated, the string end is practically integral with the sleeve 7'.

The upper end of the string 1 may be secured in a similar manner to the bottom piece 2.

Only very small compressions of the bellows 16 occur during the measuring operations. In accordance with a perferred embodiment of the pore water pressure meter the spring 9 is compressed by as little as 0.05 millimetres when the water pressure exerted on the bellows is increased from magnitude 0 to the maximum pressure which may be established by the meter in question, e.g. in the range of a pressure corresponding to a 30 meter water column.

As appears from FIG. 2 it is possible to provide the probe rod 3 with pore water pressure meters C at various locations on the probe rod whereby it becomes possible to simultaneously measure the pore water pressure at different levels in the earth. This is realized in that each pore water pressure meter is energized over a single wire line as mentioned above, which line extends outside the rod in the longitudinal direction thereof. This single wire line is also used to render possible to measure the frequency of the string 1.

Reference numeral 42 designates a microphone or other suitable instrument which may be used to register the oscillations of the oscillator 13.

The embodiments as illustrated and described are to be regarded as an example only and both the pressure meter directly influenced by the water pressure and the force meter controlled thereby as well as the power member employed to momentarily interrupt the force transmission between the pressure meter and the force meter when one desires to establish the measuring values of the force meter at zero water pressure, may be constructively altered in a variety of ways within the scope of the appended claims. The electro-magnet 21 may possibly be replaced by a power member which is operated pneumatically or hydraulically. The bellows 16 may be replaced by a diaphragm or by a piston operating inside a cylinder. Instead of using a force meter having an oscillating steel string 1 it is possible to use a meter having a number of thread extenders. The latter change their electrical resistance when they alter their length under the influence of the measured force. This change of resistance may be used for the force measuring operations. The force meter may also operate hydraulically.

What we claim is:

1. An improved pore water pressure meter attached to a probe rod for insertion into the ground, the meter comprising a pressure responsive device responsive to the pore water pressure to be measured, and a force meter arranged to be actuated by the pressure responsive device, the improvement comprising a power member operatively connected to said pressure responsive device and selectively actuatable for applying a force on said pressure responsive device of such magnitude as to override the pore water pressure force exerted by said pressure responsive device so as to prevent said pressure responsive device from affecting said force meter when said power member is actuated, and to thereafter relieve the force exerted by said power member on said force meter and allow said pressure responsive device to again transmit its force to said force meter.

2. An improved pore water pressure meter as claimed in claim 1, comprising an electro-magnet forming said power member, an armature attached to said pressure responsive device, said electro-magnet, when energized, actuating said armature to interrupt the force transmission between said pressure responsive device and said force meter.

3. An improved pore water pressure meter as claimed in claim 2, comprising a bellows forming said pressure responsive device, a pressure rod passing axially through said bellows, one end of said pressure rod secured to the movable end of said bellows and the opposite end of said pressure rod normally engaging one end of said force meter and supporting said armature cooperating with said electro-magnet.

4. An improved pore water pressure meter as claimed in claim 1, said pore water pressure meter incorporating an oscillator connected to said force meter, the improvement comprising a number of semi-conductors, said oscillator being coupled in an electric bridge connection with said semi-conductors, a further semi-conductor, the coil of said electro-magnet being coupled in parallel with said bridge in series with said further semi-conductor whereby, upon connection of said bridge to a source of direct current a voltage is applied only on said oscillator whereas upon change of polarity a voltage is applied both on said oscillator and said electro-magnet.

5. An improved pore water pressure meter as claimed in claim 1, said force meter of said pore water pressure meter incorporating a steel string one end of which is attached to said probe rod, the opposite end of said steel string being attached to a spring-actuated sleeve, the improvement comprising a transverse groove formed in said sleeve, and a transverse groove formed in said probe rod, one bar inserted into each one of said grooves, the string ends being wound about said bars, the free edges of the walls of said grooves forced over said bars and over the winding turns thereon formed by said string ends.

6. An improved pore water pressure meter as claimed in claim 5, wherein at least one end of each one of said bars has a non-round cross-sectional configuration.

* * * * *